US009787195B1

(12) United States Patent
Xiong et al.

(10) Patent No.: US 9,787,195 B1
(45) Date of Patent: Oct. 10, 2017

(54) PRIMARY CURRENT SENSING METHOD FOR ISOLATED LED DRIVER

(71) Applicant: Universal Lighting Technologies, Inc., Madison, AL (US)

(72) Inventors: Wei Xiong, Madison, AL (US); Candice Ungacta, Huntsville, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 15/246,745

(22) Filed: Aug. 25, 2016

Related U.S. Application Data

(60) Provisional application No. 62/212,931, filed on Sep. 1, 2015.

(51) Int. Cl.
*H02M 3/335* (2006.01)
*H02M 1/08* (2006.01)
*H05B 33/08* (2006.01)
*H02M 1/00* (2006.01)

(52) U.S. Cl.
CPC ......... *H02M 3/33507* (2013.01); *H02M 1/08* (2013.01); *H05B 33/0815* (2013.01); *H02M 2001/0009* (2013.01)

(58) Field of Classification Search
CPC .. H02M 3/315; H02M 3/335; H02M 3/33507; H02M 3/33538; H02M 3/33546; H02M 3/337; H02M 1/08; H02M 1/4241; H02M 2001/0009; H02M 2001/0032; H02M 2001/0048; H02M 2007/4811; H02M 2007/4815; H02M 2007/4818; H02M 7/4826; H02M 7/523; H02M 7/5233; H02M 7/519; H05B 37/02; H05B 33/0815

See application file for complete search history.

(56) References Cited

U.S. PATENT DOCUMENTS 6,018,467 A * 1/2000 Majid ............... H02M 3/33523
                                                                    363/16
2011/0242856 A1* 10/2011 Halberstadt ......... H02M 3/3376
                                                                    363/17

(Continued)

*Primary Examiner* — Emily P Pham
*Assistant Examiner* — Shahzeb K Ahmad
(74) *Attorney, Agent, or Firm* — Patterson Intellectual Property Law, P.C.; Mark J. Patterson; Gary L. Montle (57) ABSTRACT

A DC-to-AC inverter provides power to a DC-to-AC converter via an isolation transformer. The DC-to-AC converter drives a DC load. A sensing circuit on the primary side of the isolation transformer senses the current flowing through the primary winding of the transformer. A capacitor is connected across the primary winding in parallel with the magnetizing inductance of the primary winding to form a parallel L-C combination. The capacitance of the capacitor is selected with respect to the magnetizing inductance such that the parallel L-C combination resonates at a nominal steady-state operating frequency of the DC-to-AC inverter, which causes the current through the primary winding to be proportional to a current through the DC load. The current through the primary winding is sensed and provided as a feedback signal to the DC-to-AC inverter to cause the DC-to-AC inverter to adjust the operating frequency to maintain the current at a desired magnitude.

14 Claims, 3 Drawing Sheets

(56) References Cited

U.S. PATENT DOCUMENTS

| | | | | |
|---|---|---|---|---|
| 2012/0099344 A1* | 4/2012 | Adragna | ............. | H02M 3/3372 363/21.03 |
| 2012/0250360 A1* | 10/2012 | Orr | .................... | H02M 3/3376 363/21.02 |
| 2015/0102742 A1* | 4/2015 | Deng | ................. | H05B 33/0845 315/205 |
| 2015/0124489 A1* | 5/2015 | Dai | ....................... | H02M 3/335 363/17 |

* cited by examiner

PRIMARY CURRENT SENSING METHOD FOR ISOLATED LED DRIVER

CROSS-REFERENCES TO RELATED APPLICATIONS

This application claims benefit of the following patent application which is hereby incorporated by reference: U.S. Provisional Application No. 62/212,931 filed Sep. 1, 2015, entitled "Primary Current Sensing Method for Isolated LED Driver"

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The usage of light-emitting diodes (LEDs) to provide illumination is increasing rapidly as the cost of LEDs decrease and the endurance of the LEDs increases to cause the overall effective cost of operating LED lighting products to be lower than incandescent lamps and fluorescent lamps providing equivalent illumination. Also, LEDs can be dimmed by controlling the current through the LEDs because LEDs are current driven devices. The current through a plurality of LEDs in a lighting device must be controlled tightly in order to control the illumination provided by the LEDs. Although direct sensing of the current in LEDs is desirable, certain safety requirements (e.g., UL safety standards) require the secondary of an LED lighting device to be electrically isolated from the primary (line and neutral side) of the lighting device. The isolation requirement causes conventional sensing techniques in the secondary side to be costly because of the extra components required to produce signal conversion and to provide isolation.

Figure 1:
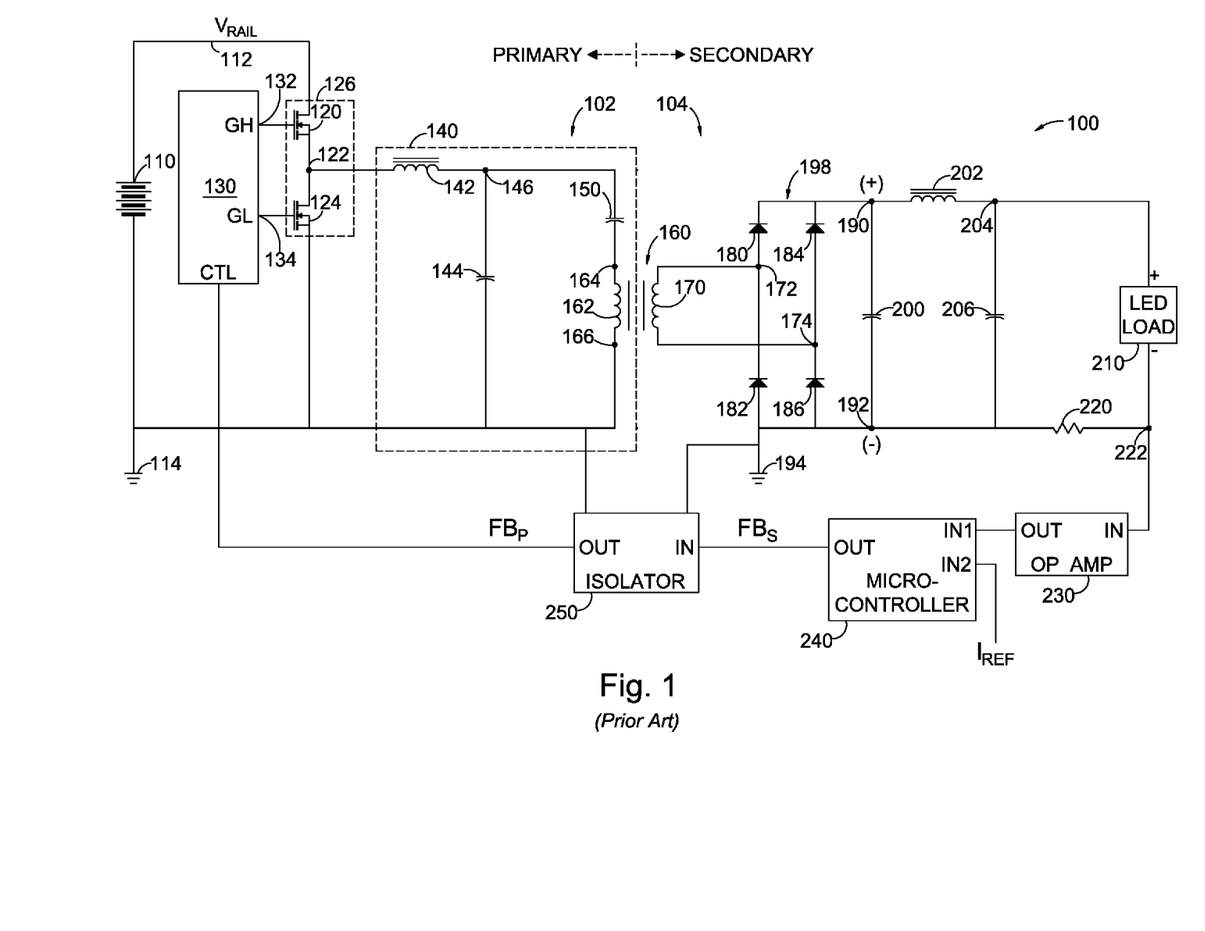
FIG. 1 illustrates a circuit diagram showing an LED driver circuit as conventionally known in the art, the LED driver circuit sensing current in the secondary portion of the circuit and having an isolator circuit to communicate a feedback signal to the primary portion of the circuit.

The foregoing problem is illustrated by a typical LED driver circuit 100 in FIG. 1. The driver circuit includes a DC-to-AC inverter 102 on a primary side of the circuit and an AC-to-DC converter 104 on a secondary side of the circuit.

The DC-to-AC inverter 102 receives a voltage from a DC source 110, which may be a DC voltage supply that produces a DC voltage from an AC source (not shown). In the illustrated driver circuit, the DC source is illustrated as a conventional battery. The voltage from the DC source is provided on a $V_{RAIL}$ supply line 112. The voltage on the $V_{RAIL}$ supply line is referenced to an input (primary side) ground reference 114. A first semiconductor switch (e.g., a power metal oxide semiconductor field effect transistor (MOSFET) or a bipolar junction transistor (BJT) 120 has a first terminal connected to the $V_{RAIL}$ supply line and has a second terminal connected to a common switching node 122. A second semiconductor switch (MOSFET or BJT) 124 has a first terminal connected to the common switching node and has a second terminal connected to the input ground reference. Together, the two switches operate as a half-bridge circuit 126 to produce a switched DC voltage on the common switching node.

The control terminal (e.g., gate of a MOSFET or base of a BJT) of the first switch 120 is connected to a first output (GH) 132 of an integrated circuit switch controller 130. The control terminal of the second switch 124 is connected to a second output (GL) 134 of the switch controller. In one embodiment, the switch controller comprises a UBA2014 driver integrated circuit (IC) commercially available from NXP B.V. of Eindhoven, Netherlands. Other switch controllers may be used. The switch controller operates in a conventional manner to turn on the first switch to couple the common switching node 122 to the $V_{RAIL}$ supply line 112. The switch controller then turns on the second switch to couple the common switching node to the input ground reference 114. When one of the switches is turned on, the other switch is turned off. The two switches are turned on and off at a selected repetition rate (operating frequency) and with selected duty cycles to produce a voltage on the common switching node that alternates between the $V_{RAIL}$ voltage and ground.

In the illustrated embodiment, the switch controller 130 varies the operating frequency in response to a control signal on a control (CTL) input of the switch controller. For example, the magnitude of the control signal may be varied in a first magnitude direction to increase the operating frequency and may be varied in a second magnitude direction to decrease the operating frequency. In the embodiment of FIG. 1 using the UBA2014 driver IC as the switch controller, the control (CTL) input is the CSW input of the IC, which is an input to an internal voltage controlled oscillator. The switch controller is responsive to an increased voltage on the control input to decrease the switching frequency and is responsive to a decreased voltage on the control input to increase the switching frequency. The source of the control signal is discussed below.

The common switching node 122 of the half-bridge circuit 126 is connected to a resonant tank circuit 140 including a resonant circuit inductor 142 and a resonant circuit capacitor 144. A first terminal of the resonant circuit inductor is connected to the common switching node of the half-bridge circuit. A second terminal of the resonant circuit inductor is connected a first terminal of the resonant circuit capacitor at a resonant tank node 146. The second terminal of the resonant circuit capacitor is connected to the input ground reference 114.

The resonant tank circuit 140 further includes a DC-blocking capacitor 150 and the primary winding 162 of an isolation transformer 160. One terminal of the DC-blocking capacitor is connected to the second terminal of the resonant circuit inductor 142 and to the first terminal of the resonant circuit capacitor 144 at the resonant tank node 146. A second terminal of the DC-blocking capacitor is connected to a first terminal 164 of the primary winding of the isolation transformer. A second terminal 166 of the primary winding of the isolation transformer is connected to the input ground reference 114. Thus, the DC-blocking capacitor is connected in series with the primary winding of the isolation transformer.

As described above, the components on the primary side of the isolation transformer 160 operate as the DC-to-AC inverter 102 to convert the DC power provided by the DC source 110 to an AC voltage applied to the primary winding 162 of the isolation transformer.

In the illustrated embodiment, the isolation transformer 160 includes a secondary winding 170 having a first terminal 172 and a second terminal 174. The first terminal of the secondary winding is connected to the anode of a first fast rectifier diode 180 and to the cathode of a second fast rectifier diode 182. The second terminal of the secondary winding is connected to the anode of a third fast rectifier diode 184 and to the cathode of a fourth fast rectifier diode 186. The cathodes of the first and third fast rectifier diodes are connected together at a positive (+) output node 190. The anodes of the second and fourth fast rectifier diodes are connected together at a negative (−) output node 192. The negative output node is connected to an output (secondary side) ground reference 194. The output ground reference is electrically isolated from the input ground reference 114 by the isolation transformer. Thus, the output ground reference may float with respect to the input ground reference as required by UL safety standards.

The four rectifier diodes 180, 182, 184, 186 form a full-wave bridge rectifier 198. The full-wave bridge rectifier operates in a conventional manner to rectify the AC voltage from the secondary winding 170 of the isolation transformer 160 to generate a rectified DC voltage between the positive output terminal 190 and the negative output terminal 192.

A first output filter capacitor 200 has a first terminal connected to the positive output terminal 190 and has a second terminal connected to the negative output terminal 192. An output filter inductor 202 has a first terminal connected to the positive output terminal and has a second terminal connected to an output voltage node 204. A second output filter capacitor 206 is connected between the output voltage node and the negative output terminal. The two output filter capacitors and the output filter inductor operate in a conventional manner to filter the pulsing DC voltage on the positive output terminal to produce a relatively smooth DC voltage on the output voltage node.

A DC load (LED load) 210 is connected across the second output filter capacitor 206. A first terminal (+) of the LED load is connected to the output voltage node 204. A second terminal (−) of the LED load is coupled to the negative output terminal 192 such that the DC voltage on the output voltage node is applied to the LED load. The DC voltage on the output voltage node is thus referenced to the output (secondary side) ground reference 194. In the illustrated embodiment, the LED load comprises a plurality of light-emitting diodes (LEDs). The LEDs may be connected in series, connected in parallel, or connected in a series-parallel combination.

The above-described components on the secondary side of the isolation transformer 160 operate as the AC-to-DC converter 104 to convert the AC voltage on the secondary winding 170 of the isolation transformer to a DC voltage applied to the LED load 210. In the illustrated embodiment, increasing the switching frequency of the DC-to-AC inverter decreases the current flowing through the LED load, and decreasing the switching frequency increases the current flowing through the LED load.

The second terminal (−) of the LED load 210 can be connected directly to the negative output terminal 192; however, in the illustrated embodiment, the second terminal of the LED load is connected to a first terminal of a current sensing resistor 220 at a sensing node 222. A second terminal of the current sensing resistor is connected to the negative output terminal. Thus, a load current flows through the LED load from the output voltage node 204 and returns to the negative output terminal via the current sensing resistor. A voltage is generated across the voltage sensing resistor proportional to the current flowing through the resistor and thus proportional to the current flowing through the LED load. The resistance of the current sensing resistor is very low (e.g., in a range from approximately 10 milliohms to approximately 50 milliohms) and the resistance tolerance of the current sensing resistor is very tight (e.g., approximately 1 percent). Thus, the voltage across the current sensing resistor measured at the sensing node represents the current flowing through the resistor very accurately. The low resistance causes the voltage drop across the currently sensing resistor to be very small (e.g., approximately 10 millivolts per ampere of current flowing through the LED load). Thus, the voltage drop across the sensing resistor does not reduce the voltage across the LED load significantly.

The voltage across the current sensing resistor 220 at the sensing node 222 is referenced to the output ground reference 194. The sensed voltage is coupled to a high-impedance input of an operational amplifier (OP AMP) 230. The operational amplifier buffers and amplifies the relatively low voltage. The operational amplifier generates an output voltage on an output. The output voltage from the operational amplifier is an analog voltage proportional to the sensed voltage. Thus, the output voltage is proportional to the current through the LED load 210.

The buffered and amplified voltage from the operational amplifier 230 is provided on a first analog input (IN1) of a microcontroller 240. The microcontroller compares the current represented by the analog input voltage with a desired current through the LED load 210. The desired current is represented by a value $I_{REF}$ on a second analog input (IN2) to the microcontroller. The microcontroller generates a secondary feedback signal (FBs) responsive to a calculated differential between the measured current and the desired current. The calculated differential can be considered to be an error value. The character of the feedback signal produced by the microcontroller is determined by parameters of a control (CTL) input of the switch controller 130 in the DC-to-AC inverter 102. As discussed above, the switch controller is responsive to an analog input signal to control the frequency of the signals applied to the control terminals of the two MOSFETs 120, 124. The microcontroller calculates or looks up a value in response to the calculated current differential and generates a value for the secondary feedback signal. The microcontroller may increase the secondary feedback signal to decrease the frequency if the sensed current is lower than the desired current. The microcontroller may decrease the secondary feedback signal to increase the frequency if the current is greater than the desired current. Accordingly, the microcontroller adjusts the secondary feedback signal to maintain the sensed current approximately equal to the desired current. As described below, the feedback signal is communicated to the control input of the switch controller, which is responsive to the feedback signal to vary the frequency to attempt to reduce the current differential to zero. Other feedback techniques may also be used.

In the embodiment of FIG. 1, the secondary feedback signal FBs is not communicated directly to the control input of the switch controller 130. Rather, the secondary feedback signal is communicated from the output of the microcontroller 240 to an input of an isolator circuit 250. The input of the isolator circuit receives the secondary feedback signal relative to the output (secondary side) ground reference 194. The isolator circuit generates a buffered primary feedback signal ($FB_P$) on an output. The buffered primary feedback signal on the output is generated relative to the input (primary side) ground reference 114. Accordingly, the isolator circuit operates to convert the secondary feedback signal (operating with respect to the secondary side ground reference) to the primary feedback signal (operating with respect to the primary side ground reference) without compromising the isolation between the two ground references. The output of the isolator circuit is provided as the input to the control input of the switch controller.

The isolator circuit 250 may be a conventional isolation circuit. For example, a commercially available HCNR200 optocoupler from Avago Technologies may be used. Other optical isolation circuits from other vendors may also be used. For example, isolation may also be provided by using a second isolation transformer to AC-couple the feedback signal between the secondary section and the primary section of the driver circuit 100.

In operation, the switched DC voltage on the common switching node 122 is AC-coupled to the primary winding 162 of the output transformer 160. Accordingly, an AC voltage is produced on the secondary winding 170 of the output transformer. The magnitude of the AC voltage will vary in accordance with the operating frequency of the switch controller 130. The AC output of the secondary winding is rectified by the full-wave bridge rectifier 198 and filtered by output filter inductor 202 and the two output filter capacitors 200, 206 to produce the DC voltage to drive the LED load 210. The current through the LED load is sensed as a voltage across the sensing resistor 220. The sensed voltage is buffered and amplified by the operational amplifier 230. The microcontroller 240 compares the current represented by the sensed voltage with a desired current (a reference current) and generates the secondary feedback signal (FB$_S$) responsive to a calculated difference between the two currents. The isolator circuit 250 converts the secondary feedback signal (referenced to the output ground reference 194) to the primary feedback signal FB$_P$ (referenced to the input ground reference 114). The primary feedback signal is applied to the control (CTL) input of the switch controller, which is responsive to the feedback signal to adjust the operating frequency of the signals applied to the control terminals of the two MOSFETs. Adjusting the operating frequency adjusts the power transferred to the secondary side of the driver circuit 100 and thus adjusts the magnitude of the current flowing through the LED load. The magnitude of the current is adjusted to reduce the calculated current difference. For example, if the sensed current is too low, the frequency is adjusted to transfer more energy into the tank circuit to increase the DC voltage and thereby increase the current through the LED load. If the sensed current is too high, the frequency is adjusted to transfer less energy into the tank circuit to decrease the DC voltage and thereby decrease the current through the LED load.

SUMMARY OF THE INVENTION

The above-described system for direct sensing of the current through the LED load requires a number of components to maintain the isolation between the primary and secondary sides of the driver circuit. The additional components would not be needed if the current were sensed and controlled on the same side of the isolation barrier.

One aspect of the embodiments disclosed herein is a driver circuit that includes a DC-to-AC inverter and an AC-to-DC converter. The DC-to-AC inverter provides power to the DC-to-AC converter via an isolation transformer. The DC-to-AC converter drives a DC load. A sensing circuit on the primary side of the isolation transformer senses the current flowing through the primary winding of the transformer. A capacitor is connected across the primary winding in parallel with the magnetizing inductance of the primary winding to form a parallel inductance-capacitance (L-C) combination. The capacitance of the capacitor is selected with respect to the magnetizing inductance such that the parallel L-C combination resonates at a nominal steady-state operating frequency of the DC-to-AC inverter, which causes the current through the primary winding to be proportional to a current through the DC load. The current through the primary winding is sensed and provided as a feedback signal to the DC-to-AC inverter to cause the DC-to-AC inverter to adjust the operating frequency to maintain the current at a desired magnitude.

Another aspect of the embodiments disclosed herein is a system for controlling the current through a DC load. The system comprises a DC-to-AC inverter that generates a primary AC voltage to a primary winding of an isolation transformer. The primary AC voltage has a nominal frequency. The primary winding has a magnetizing inductance. A rectifier circuit is connected to a secondary winding of the isolation transformer to receive a secondary AC voltage responsive to the primary AC voltage. The rectifier circuit rectifies the secondary AC voltage to provide a DC voltage to a load to cause a load current to flow through the load. A capacitor is connected across the primary winding of the isolation transformer in parallel with the magnetizing inductance of the primary winding to form a parallel inductance-capacitance (L-C) combination. The capacitor has a capacitance selected such that the parallel L-C combination resonates at a frequency near the nominal frequency. A current sensor is electrically coupled to the primary winding of the isolation transformer to sense a sensed current responsive to the primary current through the primary winding. The primary current through the primary winding is responsive to the load current through the DC load. The current sensor provides a feedback signal responsive to the sensed current. The feedback signal is provided to the DC-to-AC inverter. The DC-to-AC inverter is responsive to the feedback signal to adjust the operating frequency to produce a desired sensed current through the current sensor and thereby to produce a desired load current through the DC load.

In certain embodiments, the DC-to-AC inverter includes a switch controller that controls the frequency of the primary AC voltage. The switch controller receives a reference signal having a value corresponding to a desired sensed primary current through the primary winding. The switch controller compares the value of the reference signal with an internal signal responsive to the feedback value and adjusts the frequency of the primary AC voltage to reduce any difference between the internal signal and the value of the reference signal. In certain embodiments, the feedback signal comprises a sinusoidal signal having a non-zero value during approximately half of an AC cycle of the primary AC voltage, and the internal signal responsive to the feedback signal is an average of the sinusoidal signal over the AC cycle of the primary AC voltage.

In certain embodiments, the DC-to-AC inverter increases the frequency of the primary AC voltage when the sensed current is greater than a desired primary current, and decreases the frequency of the primary AC voltage when the sensed current is less than the desired primary current.

In certain embodiments, the current sensor comprises a first diode and a resistor. The first diode enables the primary current to flow through the primary winding in first direction and through the resistor during a first half of each cycle of the primary AC voltage. The resistor produces a voltage responsive to the current flowing through the primary winding and through the resistor during the first half of each AC cycle of the primary AC voltage. In certain embodiments, a second diode enables the primary current to flow through the primary winding in a second direction during a second half of each AC cycle of the primary AC voltage. The primary current flowing in the second direction bypasses the resistor.

In certain embodiments, a ratio of the number of turns in the primary winding to a number of turns in the secondary winding of the isolation transformer is N, and an average DC value of the current in the primary winding is 1/N times the load current through the DC load.

Another aspect in accordance with embodiments disclosed herein is a method for controlling the current through a DC load in a secondary circuit wherein the secondary circuit is isolated from a primary circuit by an isolation transformer. The primary circuit includes a DC-to-AC inverter operating at a nominal operating frequency. The DC-to-AC inverter includes at least first and second semiconductor switches controlled by a switch controller. The method includes connecting a capacitor across the primary winding of the isolation transformer to electrically connect the capacitor in parallel with the primary winding such that the capacitance of the capacitor is electrically in parallel with a magnetizing inductance of the primary winding to form a parallel inductance-capacitance (L-C) combination. The method further includes selecting the capacitance of the capacitor such that the parallel L-C combination has a resonant frequency approximately the same as the nominal operating frequency of the DC-to-AC inverter. The method further includes sensing a primary current through the primary winding of the isolation transformer to produce a feedback signal. The primary current is responsive to a secondary current through the DC load. The feedback signal has an average DC magnitude responsive to the primary current. The method further includes providing the feedback signal to the switch controller. The switch controller is responsive to the feedback signal to adjust the operating frequency to vary the primary current until the average DC magnitude of the feedback signal is substantially equal to a desired average DC magnitude of the feedback signal to cause the primary current to have a desired primary magnitude. The desired primary magnitude causes the current through the DC load to have a desired secondary magnitude.

In certain embodiments, the switch controller increases the frequency when the average DC magnitude of the feedback signal is greater than the desired average DC magnitude, and decreases the frequency when the average DC magnitude of the feedback signal is less than the desired average DC magnitude.

In certain embodiments, operating the switch controller at the resonant frequency of the parallel L-C combination causes the average DC magnitude of the primary current to be proportional to the magnitude of the secondary current through the DC load.

Another aspect in accordance with embodiments disclosed herein is a system for controlling the current through a DC load. The system includes a switch controller having a first output and a second output. Each output has an active state and an inactive state. The switch controller turns on only one of the outputs to the respective active state at any time. The switch controller turns on each output once per cycle for a selected duration determined by a selected duty cycle. The switch controller switches the first and second outputs at a nominal operating frequency. The system further includes a first semiconductor switch having a control input connected to the first output of the switch controller. The first semiconductor switch has a first terminal connected to a first voltage rail and has a second terminal connected to a common switch node. The system further includes a second semiconductor switch having a control input connected to the second output of the switch controller. The second semiconductor switch has a first terminal connected to the common switch node and has a second terminal connected to a second voltage rail. The system further includes an isolation transformer having a primary winding AC-coupled between the common switch node and the second voltage rail. The primary winding has a magnetizing inductance. The isolation transformer has a secondary winding connected to an AC-to-DC rectifier. The AC-to-DC rectifier provides a secondary current to a DC load. The system further includes a capacitor connected across the primary winding of the isolation transformer in parallel with the magnetizing inductance of the primary winding to form a parallel inductance-capacitance (L-C) combination. The capacitor has a capacitance selected to cause the parallel L-C combination to have a resonant frequency approximately the same as the nominal operating frequency of the switch controller. The system further includes a current sensor electrically coupled to the primary winding of the isolation transformer to sense a current responsive to the current through the primary winding. The current through the primary winding is responsive to the current through the DC load. The current sensor provides a feedback signal responsive to the sensed current. The feedback signal is provided to the switch controller, which is responsive to the feedback signal to adjust the operating frequency until the feedback signal has an average DC magnitude substantially equal to a desired magnitude. The desired magnitude is selected to produce a desired secondary current through the DC load.

In certain embodiments, the switch controller increases the frequency when the sensed current is greater than a desired primary current, and decreases the frequency when the sensed current is less than the desired primary current.

In certain embodiments, the magnitude of the primary current is proportional to the secondary current through the load when the nominal operating frequency of the switch controller is substantially the same as the resonant frequency of the parallel L-C combination.

DETAILED DESCRIPTION OF THE INVENTION

Figure 2:
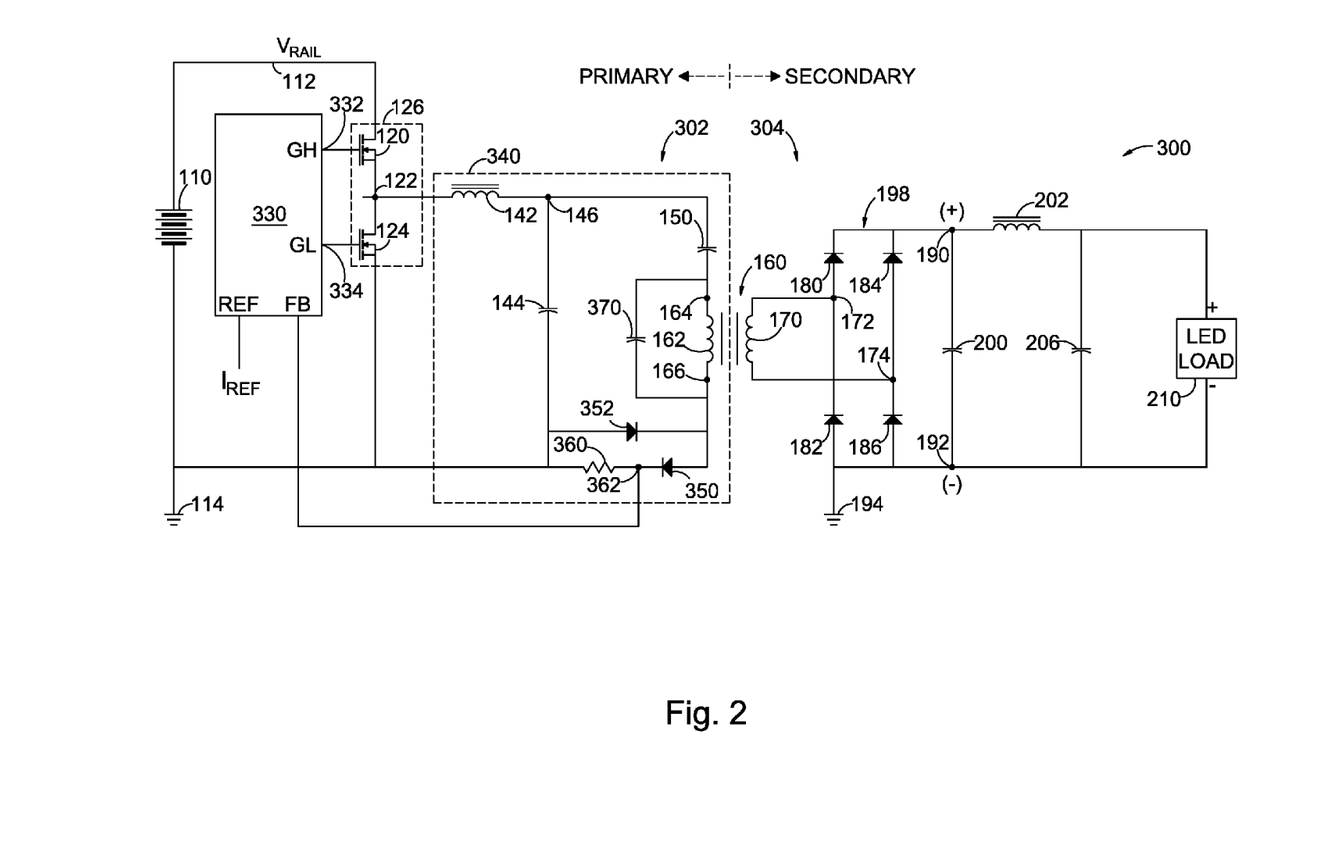
FIG. 2 illustrates a circuit diagram showing an improved LED driver circuit having current sensing in the primary circuit and providing direct feedback to the switch controller without requiring isolation of the feedback signal.

An exemplary solution to the problem disclosed in FIG. 1 is illustrated by an improved LED driver circuit 300 in FIG. 2. The LED driver circuit in FIG. 2 is similar in many aspects to the LED drive circuit 100 in FIG. 1 and corresponding components are numbered accordingly. The basic forward operational characteristics of a DC-AC inverter 302 on the primary side of the isolation transformer 160 and an AC-DC converter 304 on the secondary side of the transformer are similar to the previously described operational characteristics. Accordingly, the basic operation is not described again.

Unlike the previously described LED driver circuit 100 of FIG. 1, the improved LED driver circuit 300 of FIG. 2 does not have a feedback circuit from the secondary side to the primary side. The current sensing resistor 220, the operational amplifier 230, the microcontroller 240 and the isolator circuit 250 of FIG. 1 are not required in the LED driver circuit of FIG. 2. In FIG. 2 the negative (−) terminal of the LED load 210 is connected directly to the negative output terminal 192 and thus is connected directly to the output ground reference 194.

The switch controller 130 of FIG. 1 is replaced with a switch controller 330 in FIG. 2. In one embodiment, the switch controller also comprises a UBA2014 driver IC commercially available from NXP B.V. of Eindhoven, Netherlands. Other switch controllers may be used.

The switch controller 330 has a first output 332 and a second output 334 to control the two MOSFETs 120, 124 in the half-bridge circuit 126 as described above. Unlike the previously described switch controller 130, the switch controller in FIG. 2 utilizes two inputs to control the switching frequency. The switch controller includes an internal average current sensor. The internal average current sensor receives a first input (reference) signal on an $I_{REF}$ input that has a value representing a desired current. The internal average current sensor receives a second input signal on a feedback (FB) (or control) input that is responsive to the load current, as described below. In the illustrated embodiment, the $I_{REF}$ input corresponds to the negative input for the internal average current sensor, and the FB input corresponds to the positive input for the internal average current sensor. The two inputs are identified as CSN and CSP, respectively, in the technical literature for the UBA2014 driver IC.

The reference signal on the $I_{REF}$ input of the switch controller 330 represents a desired current magnitude for the primary winding 162, which results in the desired current magnitude through the LED load 210 in the secondary section (AC-to-DC converter 304) of the driver circuit 300. As discussed above, the switch controller includes internal circuitry (an average current sensor) that compares the value on the feedback input with the value on the reference input to generate an internal error value. The switch controller is responsive to the internal error value to adjust the operating frequency of the switch control signals on the first and second outputs. The switch controller adjusts the operating frequency to increase or decrease the current through the primary winding 162 of the isolation transformer 160 until the desired current magnitude is achieved. For example, when the sensed current is too high (e.g., the feedback signal is greater than the reference signal, the frequency is increased to reduce the sensed current. When the sensed current is too low (e.g., the feedback signal is less than the reference signal, the frequency is decreased to increase the sensed current.

The resonant tank circuit 140 of FIG. 1 is replaced with a modified resonant tank circuit 340 in FIG. 2. In FIG. 2, the resonant circuit inductor 142, the resonant circuit capacitor 144, and the DC blocking capacitor 150 are connected in like manner to the connections in FIG. 1. The first terminal 164 of the primary winding 162 of the isolation transformer 160 is connected to the second terminal of the DC blocking capacitor as before.

In FIG. 2, the second terminal 166 of the primary winding is not connected directly to the input ground reference 114. Instead, the second terminal 166 of the primary winding 162 of the isolation transformer 160 is connected to the anode of a forward path diode 350 and to the cathode of a reverse path diode 352. The anode of the reverse path diode is connected to the input ground reference 114. The cathode of the forward path diode is connected to a first terminal of a current sensing resistor 360 at a sensing node 362. A second terminal of the current sensing resistor is connected to the input ground reference. The forward path diode operates to allow current to flow through the primary winding in a first direction when the first MOSFET 120 is switched on. The reverse path diode operates to allow current to flow through the primary winding in the opposite direction when the second MOSFET 124 is turned on.

The sensing resistor 360 develops a voltage on the sensing node 362 with respect to the input ground reference 114 when current is flowing in the first direction through the forward path diode 350. As described above, the current sensing resistor may have a resistance in the range of approximately 10 milliohms to approximately 50 milliohms and may have a resistance tolerance of approximately 1 percent. Thus, the current sensing resistor does not affect the voltage applied to the primary winding 162 of the isolation transformer 160.

The power tank circuit 340 of FIG. 2 further includes a primary resonant capacitor 370. The primary winding resonant capacitor has a first terminal connected to the first terminal 164 of the primary winding 162 of the isolation transformer. The primary resonant capacitor has a second terminal connected to the second terminal 166 of the primary winding. Thus, the primary resonant capacitor is connected in parallel with the primary winding. The primary resonant capacitor has a capacitance $C_P$.

Figure 3:
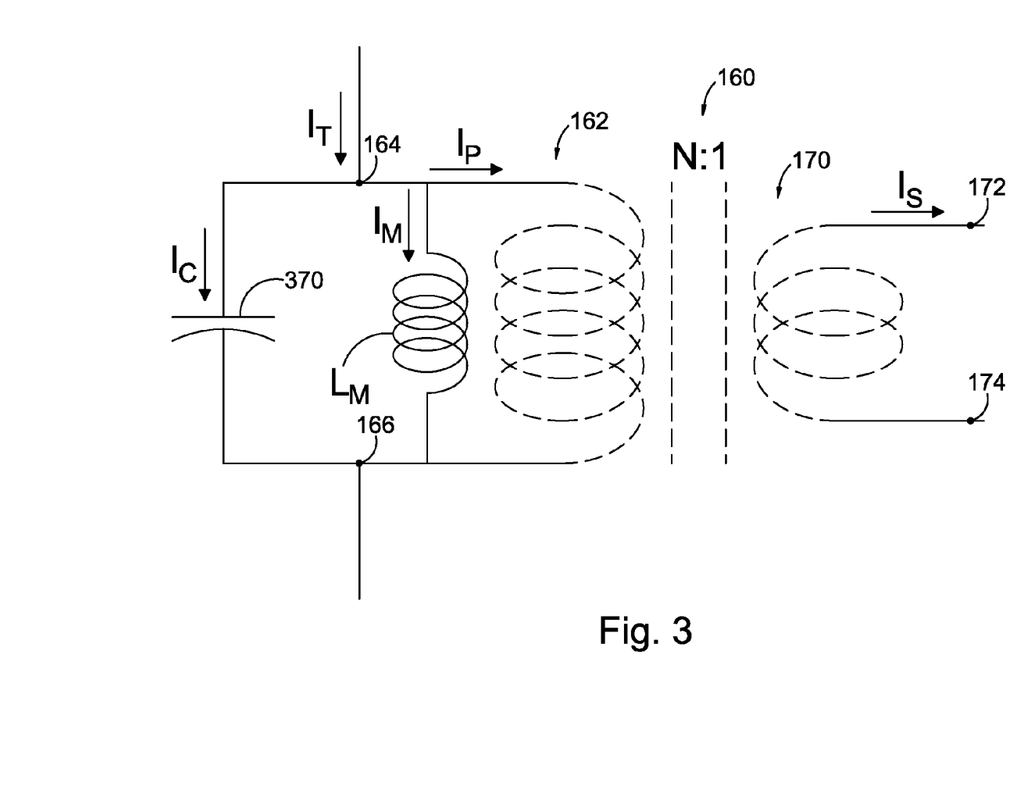
FIG. 3 illustrates an equivalent circuit representation of the isolation transformer and related components to explain how the second current in the LED load is reflected back to the primary of the isolation transformer to provide a current that is sensed to provide a feedback signal.

FIG. 3 illustrates an equivalent circuit of the isolation transformer 160 with the primary resonant capacitor 370 connected across the primary winding 162. In the equivalent circuit representation, the isolation transformer is represented as an ideal transformer with the "lossless" primary and secondary windings shown in dashed lines. The windings have a turns ratio from the primary winding to the secondary winding of N:1. An actual (non-ideal) transformer requires a magnetizing current in the primary winding. Thus, the primary winding is shown with a magnetizing inductance $L_M$ across the idealized primary winding. Accordingly, the capacitance $C_P$ of the primary resonant capacitor is electrically in parallel with the magnetizing inductance $L_M$. For reasons discussed below, the capacitance $C_P$ is selected with respect to the inductance $L_M$ such that the resonant frequency of the parallel L-C combination is substantially the same as the nominal steady-state operating frequency of the switch controller 330. Thus, the impedance of the parallel L-C combination is very high when the circuit of FIG. 2 is operating at or near the nominal steady-state operating frequency. For example, in one embodiment, the magnetizing inductance $L_M$ has a value of approximately 2.8 millihenries and the resonant capacitor has a capacitance $C_P$ of approximately 3.6 nanofarads such that the resonant frequency is approximately 50 kHz.

As shown in FIG. 3, a secondary current $I_S$ flows out of the secondary winding 170. A total current $I_T$ is applied to the parallel combination of the primary resonant capacitor 370 and the primary winding 162 of the transformer 160. A first portion $I_C$ of the total current $I_T$ passes through the primary resonant capacitor. A second portion $I_M$ of the total current $I_T$ passes through the magnetizing inductance $L_M$. A third portion $I_P$ of the total current $I_T$ passes through the ideal primary winding. In the idealized representation, the third portion $I_P$ is equal to the secondary current $I_S$ divided by the primary-to-secondary turns ratio (e.g., $I_P = I_S/N$).

The foregoing current relationship can be represented by the following Equation (1):

$$I_T = I_C + I_M + I_P = I_C + I_M + \frac{I_S}{N} \quad (1)$$

As discussed above, the capacitance $C_P$ of the primary resonant capacitor 370 is selected with respect to the magnetizing inductance $L_M$ such that the parallel L-C combination resonates at the nominal steady-state operating frequency of the circuit. At resonance, the current through the primary resonant capacitor and the current through the magnetizing inductor cancel out such that Equation (1) simplifies to the following Equation (2):

$$I_T = \frac{I_S}{N} \quad (2)$$

Equation (2) shows that the total primary current $I_T$ is proportional to the secondary current $I_S$. The secondary current corresponds to the current $I_{LED}$ through the LED load 210. Thus, measuring the total primary current $I_T$ can be used to accurately sense and thereby control the current through the LED load when the nominal steady-state operating frequency corresponds to the resonant frequency of the parallel combination of the primary resonant capacitor 370 and the magnetizing inductance $L_M$.

The following analysis confirms the foregoing result using the reactive impedances in the circuit. The total impedance $Z_T$ of the primary resonant capacitor 370 in parallel with the magnetizing inductance $L_M$ is determined in accordance with the following Equation (3):

$$Z_T = \left| \frac{1}{\frac{1}{Z_P} + \frac{1}{N^2 R_{LED}}} \right| \quad (3)$$

In Equation (3), $Z_P$ is the impedance of the primary resonant capacitor 370 in parallel with the magnetizing inductance $L_M$, and $R_{LED}$ is the effective resistance of the LED load 210. It can be shown that when the load resistance is transformed from the secondary side to the primary side of the transformer 160, the effective load resistance on the primary side is the secondary side load resistance multiplied by the square of the primary-to-secondary turns ratio (e.g., $N^2 R_{LED}$ as shown in Equation (3)).

$Z_P$ in Equation (3) is determined in accordance with the following Equation (4):

$$Z_P = \left| \frac{1}{j\omega C_P + \frac{1}{j\omega L_M}} \right| = \frac{j\omega L_M}{1 - \omega^2 C_P} \quad (4)$$

By substituting Equation (4) into Equation (3), the total impedance $Z_T$ is determined by the following Equation (5):

$$Z_T = \left| \frac{1}{\frac{1-\omega^2 C_P}{j\omega L_M} + \frac{1}{N^2 R_{LED}}} \right| = \left| \frac{1}{1 - \frac{\omega^2}{\omega_{RES}^2}} + \frac{1}{N^2 R_{LED}} \right| \quad (5)$$

In Equation 5, $\omega$ is the nominal steady-state operating frequency of the circuit in radians (i.e., $\omega = 2\pi f$, where f is the frequency in Hertz); and $\omega_{RES}$ is the resonant frequency in radians of the parallel L-C combination of the primary resonant capacitor 370 and the magnetizing inductance $L_M$, where $\omega_{RES}$ can be determined by the following Equation (6):

$$\omega_{RES} = \frac{1}{\sqrt{C_P \times L_M}} \quad (6)$$

The capacitance of the primary resonant capacitor 370 is selected based on the nominal steady-state operating frequency ($\omega$) of the LED driver circuit 300 and based on the magnetizing inductance $L_M$, such that the resonant frequency ($\omega_{RES}$) of the L-C parallel combination is set to $\omega$. Thus, Equation (5) is simplified to the following Equation (7):

$$Z_T = \left| \frac{1}{\frac{1-1}{j\omega L_M} + \frac{1}{N^2 R_{LED}}} \right| = N^2 R_{LED} \quad (7)$$

Equation (7) shows that the total impedance of the primary circuit (the sensing branch in FIG. 2) is directly proportional to the impedance of the LED load 210. The total primary current $I_T$ can be determined in accordance with the following Equation (8) in accordance with Ohm's law:

$$I_T = \frac{N \times V_{LED}}{N^2 \times R_{LED}} = \frac{I_{LED}}{N} \quad (8)$$

In Equation (8), $I_{LED}$ corresponds to the secondary current $I_S$ in Equation (2). Thus, the result in Equation (8) agrees with the result in Equation (2), which confirms the accuracy of Equation (2). In accordance with Equation (8), the magnitude of the secondary current can be determined by sensing the total primary current $I_T$ when the resonant frequency of the L-C combination of the primary resonant capacitor 370 and the magnetizing inductance $L_M$ is the same as the nominal steady-state operating frequency of the switch controller 130. This total primary current $I_T$ is sensed by the sensing resistor 360 as a sinusoidal voltage on the sensing node 362 during the half-cycle when the current is flowing through the forward path diode 350. The sinusoidal voltage is fed back to the feedback (FB) input of the switch controller as a voltage proportional to the total current $I_T$. The internal average current sensor within the switch controller translates the sinusoidal voltage signal received on the FB input during the active half-cycle to an average DC voltage. The average current sensor compares the average DC voltage to an input value on a reference input (REF) that represents a desired secondary current through the LED load 210. The reference input value is selected such that when the average DC value of the feedback voltage is equal to the reference value, the operating frequency of the control signal applied to the two MOSFET switches 120, 124 causes the desired current to flow through the LED load. If the average DC value of the feedback voltage is different from the reference value, the operating frequency is adjusted to increase or decrease the sensed current until equilibrium is achieved. The input value on the reference input of the switch controller is selected to compensate for the sensed voltage being generated during only one half of each voltage cycle and to compensate for the variation in magnitude during the active half cycle.

Although the operating frequency may be adjusted to a frequency slightly different from the nominal steady-state operating frequency, the parallel L-C combination across the terminals of the primary winding 162 of the isolation transformer 160 is sufficiently close to being in resonance that the current flowing through the L-C combination is negligible. Thus, the current through the sensing resistor 360 continues to be substantially proportional to the load current through the LED load 210, and the sensed voltage on the sensing node 362 continues to be substantially proportional to the load current.

In summary, the improved LED driver circuit 300 of FIG. 2 achieves secondary current sensing without requiring an isolated feedback circuit by sensing the current in the primary. The primary current sensing is achieved by including an impedance matching capacitor (the primary resonant capacitor 370) across the primary winding 162 of the isolation transformer 160. The resonant frequency of the primary resonant capacitor in parallel with the magnetizing inductance of the transformer is selected to be the same as the nominal steady-state operating frequency of the driver circuit. The current through the primary resonant capacitor cancels the magnetizing current through the magnetizing inductance such that the total primary current is proportional to the secondary current through the LED load 210. Thus, the secondary current can be determined by multiplying the measured total primary current by a proportionality constant. Feeding back the value responsive to the sensed primary current accomplishes accurate control of the secondary current without requiring a feedback signal to cross the isolation barrier between the secondary side and primary side of the driver circuit.

The previous detailed description has been provided for the purposes of illustration and description. Thus, although there have been described particular embodiments of the present invention of a new and useful "Primary Current Sensing Method for Isolated LED Driver," it is not intended that such references be construed as limitations upon the scope of this invention except as set forth in the following claims.

What is claimed is:

1. A system for controlling the current through a DC load, the system comprising:
   a DC-to-AC inverter configured to generate a primary AC voltage to a primary winding of an isolation transformer, the primary AC voltage having a nominal frequency, the primary winding having a magnetizing inductance, wherein
      the DC-to-AC inverter includes a switch controller configured to control the frequency of the primary AC voltage; and
      the switch controller is configured to receive a reference signal having a value corresponding to a desired sensed primary current through the primary winding;
   a rectifier circuit connected to a secondary winding of the isolation transformer to receive a secondary AC voltage responsive to the primary AC voltage, the rectifier circuit configured to rectify the secondary AC voltage to provide a DC voltage to a load to cause a load current to flow through the load;
   a capacitor connected across the primary winding of the isolation transformer in parallel with the magnetizing inductance of the primary winding to form a parallel inductance-capacitance (L-C) combination, the capacitor having a capacitance selected such that the parallel L-C combination resonates at a frequency near the nominal frequency; and
   a current sensor electrically coupled to the primary winding of the isolation transformer and configured to sense a sensed current responsive to the primary current through the primary winding, the primary current through the primary winding responsive to the load current through the DC load, the current sensor configured to provide a feedback signal responsive to the sensed current, the feedback signal provided to the DC-to-AC inverter, the DC-to-AC inverter responsive to the feedback signal to adjust the operating frequency to produce a desired sensed current through the current sensor and thereby to produce a desired load current through the DC load, wherein:
      the switch controller is further configured to compare the value of the reference signal with an internal signal responsive to the feedback value;
      the switch controller is configured to adjust the frequency of the primary AC voltage to reduce any difference between the internal signal and the value of the reference signal;
      the feedback signal comprises a sinusoidal signal having a non-zero value during approximately half of an AC cycle of the primary AC voltage; and
      the internal signal responsive to the feedback signal is an average of the sinusoidal signal over the AC cycle of the primary AC voltage.

2. The system as defined in claim 1, wherein:
   the DC-to-AC inverter is configured to increase the frequency of the primary AC voltage when the sensed current is greater than a desired primary current; and
   the DC-to-AC inverter is further configured to decrease the frequency of the primary AC voltage when the sensed current is less than the desired primary current.

3. The system as defined in claim 1, wherein:
   a ratio of the number of turns in the primary winding to a number of turns in the secondary winding of the isolation transformer is N; and
   an average DC value of the current in the primary winding is 1/N times the load current through the DC load.

4. A system for controlling the current through a DC load, the system comprising:
   a DC-to-AC inverter configured to generate a primary AC voltage to a primary winding of an isolation transformer, the primary AC voltage having a nominal frequency, the primary winding having a magnetizing inductance;
   a rectifier circuit connected to a secondary winding of the isolation transformer to receive a secondary AC voltage responsive to the primary AC voltage, the rectifier circuit configured to rectify the secondary AC voltage to provide a DC voltage to a load to cause a load current to flow through the load;
   a capacitor connected across the primary winding of the isolation transformer in parallel with the magnetizing inductance of the primary winding to form a parallel inductance-capacitance (L-C) combination, the capacitor having a capacitance selected such that the parallel L-C combination resonates at a frequency near the nominal frequency; and
   a current sensor electrically coupled to the primary winding of the isolation transformer and configured to sense a sensed current responsive to the primary current through the primary winding, the primary current through the primary winding responsive to the load current through the DC load, the current sensor configured to provide a feedback signal responsive to the sensed current, the feedback signal provided to the DC-to-AC inverter, the DC-to-AC inverter responsive to the feedback signal to adjust the operating frequency to produce a desired sensed current through the current sensor and thereby to produce a desired load current through the DC load, wherein the current sensor comprises a first diode and a resistor, the first diode enabling the primary current to flow through the primary winding in first direction and through the resistor during a first half of each cycle of the primary AC voltage, the resistor producing a voltage responsive to the current flowing through the primary winding and through the resistor during the first half of each AC cycle of the primary AC voltage.

5. The system as defined in claim 4, wherein:
the DC-to-AC inverter includes a switch controller configured to control the frequency of the primary AC voltage;
the switch controller is configured to receive a reference signal having a value corresponding to a desired sensed primary current through the primary winding;
the switch controller is configured to compare the value of the reference signal with an internal signal responsive to the feedback value; and
the switch controller is configured to adjust the frequency of the primary AC voltage to reduce any difference between the internal signal and the value of the reference signal.

6. The system as defined in claim 4, wherein:
the DC-to-AC inverter is configured to increase the frequency of the primary AC voltage when the sensed current is greater than a desired primary current; and
the DC-to-AC inverter is further configured to decrease the frequency of the primary AC voltage when the sensed current is less than the desired primary current.

7. The system as defined in claim 4, further comprising a second diode, the second diode enabling the primary current to flow through the primary winding in a second direction during a second half of each AC cycle of the primary AC voltage, the primary current flowing in the second direction bypassing the resistor.

8. The system as defined in claim 4, wherein:
a ratio of the number of turns in the primary winding to a number of turns in the secondary winding of the isolation transformer is N; and
an average DC value of the current in the primary winding is 1/N times the load current through the DC load.

9. A method for controlling the current through a DC load in a secondary circuit wherein the secondary circuit is isolated from a primary circuit by an isolation transformer, the primary circuit including a DC-to-AC inverter operating at a nominal operating frequency, the DC-to-AC inverter including at least first and second semiconductor switches controlled by a switch controller, the method comprising:
connecting a capacitor across the primary winding of the isolation transformer to electrically connect the capacitor in parallel with the primary winding such that the capacitance of the capacitor is electrically in parallel with a magnetizing inductance of the primary winding to form a parallel inductance-capacitance (L-C) combination;
selecting the capacitance of the capacitor such that the parallel L-C combination has a resonant frequency approximately the same as the nominal operating frequency of the DC-to-AC inverter;
sensing a primary current through the primary winding of the isolation transformer to produce a feedback signal, the primary current responsive to a secondary current through the DC load, the feedback signal having an average DC magnitude responsive to the primary current; and
providing the feedback signal to the switch controller, the switch controller responsive to the feedback signal to adjust the operating frequency to vary the primary current until the average DC magnitude of the feedback signal is substantially equal to a desired average DC magnitude of the feedback signal to cause the primary current to have a desired primary magnitude, the desired primary magnitude causing the current through the DC load to have a desired secondary magnitude.

10. The method as defined in claim 9, wherein:
the switch controller increases the frequency when the average DC magnitude of the feedback signal is greater than the desired average DC magnitude; and
the switch controller decreases the frequency when the average DC magnitude of the feedback signal is less than the desired average DC magnitude.

11. The method as defined in claim 9, wherein operating the switch controller at the resonant frequency of the parallel L-C combination causes the average DC magnitude of the primary current to be proportional to the magnitude of the secondary current through the DC load.

12. A system for controlling the current through a DC load, the system comprising:
a switch controller having a first output and a second output, each output having an active state and an inactive state, the switch controller configured to turn on only one of the outputs to the respective active state at any time, the switch controller further configured to turn on each output once per cycle for a selected duration determined by a selected duty cycle, the switch controller also configured to switch the first and second outputs at a nominal operating frequency;
a first semiconductor switch having a control input connected to the first output of the switch controller, the first semiconductor switch having a first terminal connected to a first voltage rail and having a second terminal connected to a common switch node;
a second semiconductor switch having a control input connected to the second output of the switch controller, the second semiconductor switch having a first terminal connected to the common switch node and having a second terminal connected to a second voltage rail;
an isolation transformer having a primary winding AC-coupled between the common switch node and the second voltage rail, the primary winding having a magnetizing inductance, the isolation transformer having a secondary winding connected to an AC-to-DC rectifier, the AC-to-DC rectifier providing a secondary current to a DC load;
a capacitor connected across the primary winding of the isolation transformer in parallel with the magnetizing inductance of the primary winding to form a parallel inductance-capacitance (L-C) combination, the capacitor having a capacitance selected to cause the parallel L-C combination to have a resonant frequency approximately the same as the nominal operating frequency of the switch controller; and
a current sensor electrically coupled to the primary winding of the isolation transformer to sense a current responsive to the current through the primary winding, the current through the primary winding responsive to the current through the DC load, the current sensor configured to provide a feedback signal responsive to the sensed current, the feedback signal provided to the switch controller, the switch controller responsive to the feedback signal to adjust the operating frequency until the feedback signal has an average DC magnitude substantially equal to a desired magnitude, the desired magnitude selected to produce a desired secondary current through the DC load.

13. The system as defined in claim 12, wherein:
the switch controller is configured to increase the frequency when the sensed current is greater than a desired primary current; and
the switch controller is further configured to decrease the frequency when the sensed current is less than the desired primary current.

14. The system as defined in claim 12, wherein the magnitude of the primary current is proportional to the secondary current through the load when the nominal operating frequency of the switch controller is substantially the same as the resonant frequency of the parallel L-C combination.

* * * * *